(12) United States Patent
Figueiredo et al.

(10) Patent No.: US 6,810,904 B2
(45) Date of Patent: Nov. 2, 2004

(54) LAVATORY FLUSH TANK SILENT-OPERATING FILL DEVICE

(75) Inventors: Noe Figueiredo, Aveiro (PT); Antonio Manuel Gameiro Lopes, Assafarge-Coimbra (PT); Victor Antonio Ferreira Da Costa, Aveiro (PT); Antonio Manuel Moura De Oliveira, Aveiro (PT)

(73) Assignee: Oliveira & Irmao, S.A. (IT)

( * ) Notice: Subject to any disclaimer, the term of this patent is extended or adjusted under 35 U.S.C. 154(b) by 0 days.

(21) Appl. No.: 10/421,101

(22) Filed: Apr. 23, 2003

(65) Prior Publication Data

US 2003/0226591 A1 Dec. 11, 2003

(30) Foreign Application Priority Data

Apr. 23, 2002 (IT) .................... MI2002A0882

(51) Int. Cl.⁷ .................. F16K 31/22; F16K 31/34; F16K 47/02; F16K 47/10
(52) U.S. Cl. ............... 137/436; 137/414; 137/426; 137/430; 137/433; 137/443; 138/42; 138/44; 181/234; 251/118
(58) Field of Search ................. 137/414, 426, 137/430, 432, 434, 435, 436, 437, 442, 443, 444, 433; 138/42, 44; 181/233, 234; 251/118, 126, 127

(56) References Cited

U.S. PATENT DOCUMENTS

| | | | | |
|---|---|---|---|---|
| 1,497,796 A | * | 6/1924 | Sherwood | 137/437 |
| 1,901,633 A | * | 3/1933 | Clemmons | 137/436 |
| 2,111,614 A | * | 3/1938 | Cox | 137/445 |
| 2,129,958 A | * | 9/1938 | Podolsky | 251/127 |
| 2,738,851 A | | 3/1956 | Warch | |
| 3,704,857 A | | 12/1972 | Claridge | |
| 4,338,964 A | * | 7/1982 | Schoepe | 137/436 |
| 4,600,031 A | * | 7/1986 | Nestich | 137/432 |
| 4,635,751 A | | 1/1987 | Howell | |
| 4,763,687 A | | 8/1988 | Arth et al. | |
| 4,938,245 A | * | 7/1990 | Schoepe et al. | 181/234 |
| 5,738,141 A | * | 4/1998 | Blanke et al. | 137/436 |
| 6,354,326 B1 | * | 3/2002 | Le et al. | 138/42 |
| 6,679,285 B2 | * | 1/2004 | Pablo | 137/436 |

FOREIGN PATENT DOCUMENTS

| | | |
|---|---|---|
| DE | 2210846 | 3/1973 |
| DE | 2254553 | 5/1974 |
| EP | 0424274 | 4/1991 |
| GB | 502130 | 3/1939 |

* cited by examiner

Primary Examiner—George L. Walton
(74) Attorney, Agent, or Firm—Frost Brown Todd LLC

(57) ABSTRACT

A lavatory flush tank silent-operating fill device has a silencer extending along an axis and through which a stream of water flows; a number of channels are defined inside the silencer by a bundle of substantially straight, parallel tubes housed inside the silencer and parallel to the axis, and into which the stream of water is divided; and the flow section of the channels is such that flow of the water inside is substantially laminar.

13 Claims, 2 Drawing Sheets

LAVATORY FLUSH TANK SILENT-OPERATING FILL DEVICE

The present invention relates to a lavatory flush tank silent-operating fill device.

BACKGROUND OF THE INVENTION

Various types of flush tank fill devices are known with special noise-reducing features.

European Patent Application EP-A-424274, for example, proposes reducing noise by circulating the water in a chamber filled with solid spheroidal bodies. Though fairly effective, this solution still leaves room for further improvement in terms of noise reduction, besides involving various manufacturing problems (mainly due to the need to produce and insert the solid bodies inside the chamber).

SUMMARY OF THE INVENTION

It is therefore an object of the present invention to provide a fill device as an alternative to known solutions, and which, in addition to being fully effective in terms of noise reduction, is also cheap and easy to produce.

According to the present invention, there is provided a lavatory flush tank silent-operating fill device, as claimed in the accompanying claim 1.

Besides being cheap and easy to produce, tests have shown the device according to the invention to be fully effective in reducing noise.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
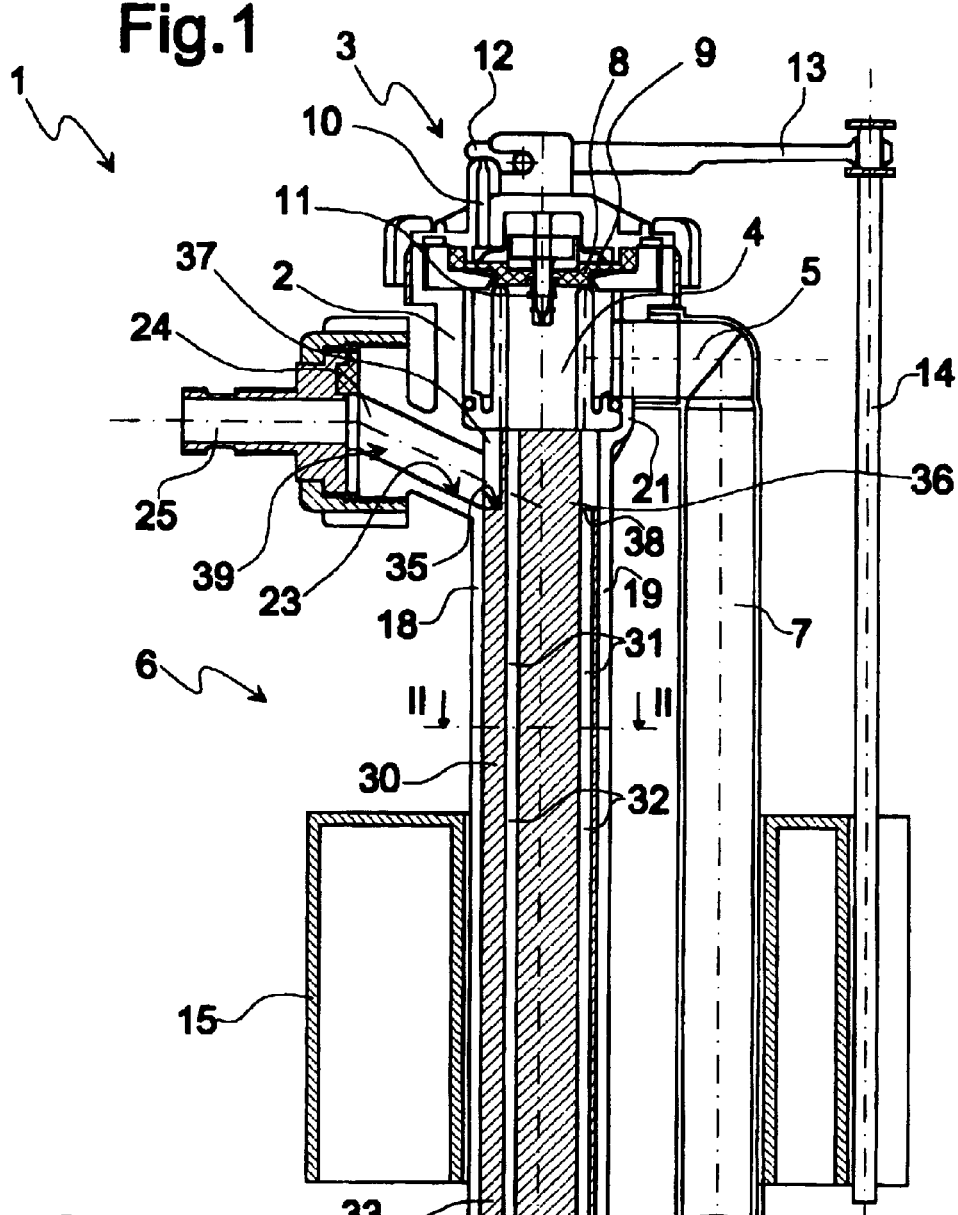
FIG. 1 shows a schematic longitudinal section of a first embodiment of a fill device in accordance with the invention.
Figure 2:
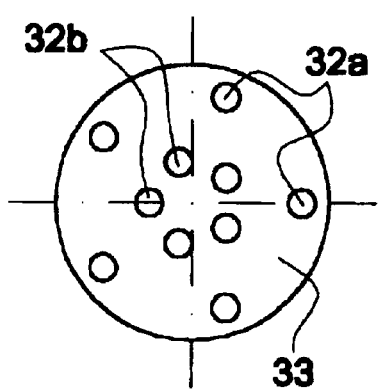
FIG. 2 shows a section along line II—II in FIG. 1.

With reference to FIGS. 1 and 2, a silent-operating device 1 for filling a flush tank (not shown) comprises a body 2 housing a valve assembly 3 interposed between an inlet conduit 4 and an outlet conduit 5; inlet conduit 4 is connected to a silencer 6 located beneath body 2, and which extends along an axis A and, in use, is substantially vertical; and outlet conduit 5 is connected to an outflow pipe 7 substantially parallel to axis A.

In the non-limiting example in FIG. 1, valve assembly 3 is a known diaphragm valve assembly and therefore not described or illustrated in detail for the sake of simplicity. Generally speaking, valve assembly 3 comprises a disk-shaped diaphragm 8 made of flexible material and closing a counterpressure chamber 9; counterpressure chamber 9 has a relief hole 10, and communicates with inlet conduit 4 via a small-section nozzle 11 fitted through diaphragm 8; a shutter 12, controlled by a lever 13 connected to a float 15 by an adjustable rod 14, selectively opens and closes relief hole 10; and diaphragm 8 is elastically deformable to allow water to flow from inlet conduit 4 to outlet conduit 5 when relief hole 10 is open.

Silencer 6 comprises a substantially tubular casing 18 having a central axis of symmetry defined by axis A; and casing 18 has a lateral wall 19 defining a substantially cylindrical inner chamber 20, and comprises an axial end 21 (e.g. threaded) for connection to body 2, and a free axial end 22 opposite axial end 21.

At axial end 21, casing 18 comprises an inlet opening 23 formed radially through lateral wall 19, and by which chamber 20 is connected to a feed conduit 24; feed conduit 24 is in turn connected to a fitting 25 for connection to the external water mains; and axial end 22 of casing 18 is closed by a bottom 26 defining an inner compartment 27 having an annular shoulder 28.

Chamber 20 houses a cartridge 30, which may be removable, and which has a number of channels 31 extending substantially along axis A and into which the water flowing inside silencer 6 is divided. More specifically, the number of channels 31 is defined by a bundle of substantially straight, parallel, circular-section tubes 32 housed inside cartridge 30 and parallel to axis A.

In the non-limiting example in FIG. 1, cartridge 30 comprises a solid cylindrical body 33, and tubes 32 are formed axially through body 33; body 33 is housed in sliding manner inside chamber 20, and has a circular end surface 34 resting on shoulder 28; at axial end 21 of casing 18, body 33 has an annular edge 35 surrounding a smaller-diameter central portion 36 extending along axis A; and an annular conduit 37 is defined between portion 36 and lateral wall 19, and communicates with feed conduit 24 via opening 23.

First tubes 32a extend between annular edge 35—at which respective access openings 38 of tubes 32a come out—and end surface 34, thus connecting annular conduit 37 to compartment 27; annular conduit 37 and annular edge 35 with access openings 38 define a conveyor 39 for conveying the water from feed conduit 24 into tubes 32a; second tubes 32b extend between end surface 34 and a free end of portion 36, thus connecting compartment 27 to inlet conduit 4; and compartment 27 bounded by bottom 26 defines a junction 40 connecting tubes 32a and tubes 32b.

The flow section (i.e. internal cross section) of tubes 32 is such that flow of the water inside is substantially laminar.

More specifically, the inside diameter of the tubes preferably ranges between roughly 0.5 and 3 mm.

In actual use, when valve assembly 3, controlled by float 15, is opened, as known, to fill the flush tank, water from the mains flows through fitting 25 and along feed conduit 24, is conveyed and divided by conveyor 39 into tubes 32a, flows down tubes 32a to compartment 27, and then back up along tubes 32b to inlet conduit 4. Flow along tubes 32a and 32b is laminar and in opposite directions.

On exceeding diaphragm 8, water flows from inlet conduit 4 into outlet conduit 5, and from there into outflow pipe 7; and, when the flush tank is full, the float closes valve assembly 3 to cut off the water supply. The noise produced when filling the flush tank is thus significantly reduced, as conformed by testing.

Location of silencer 6 upstream from valve assembly 3 eliminates the vibration wave typically associated with the transient closing state of valve assembly 3, thus further reducing overall noise.

Figure 3:
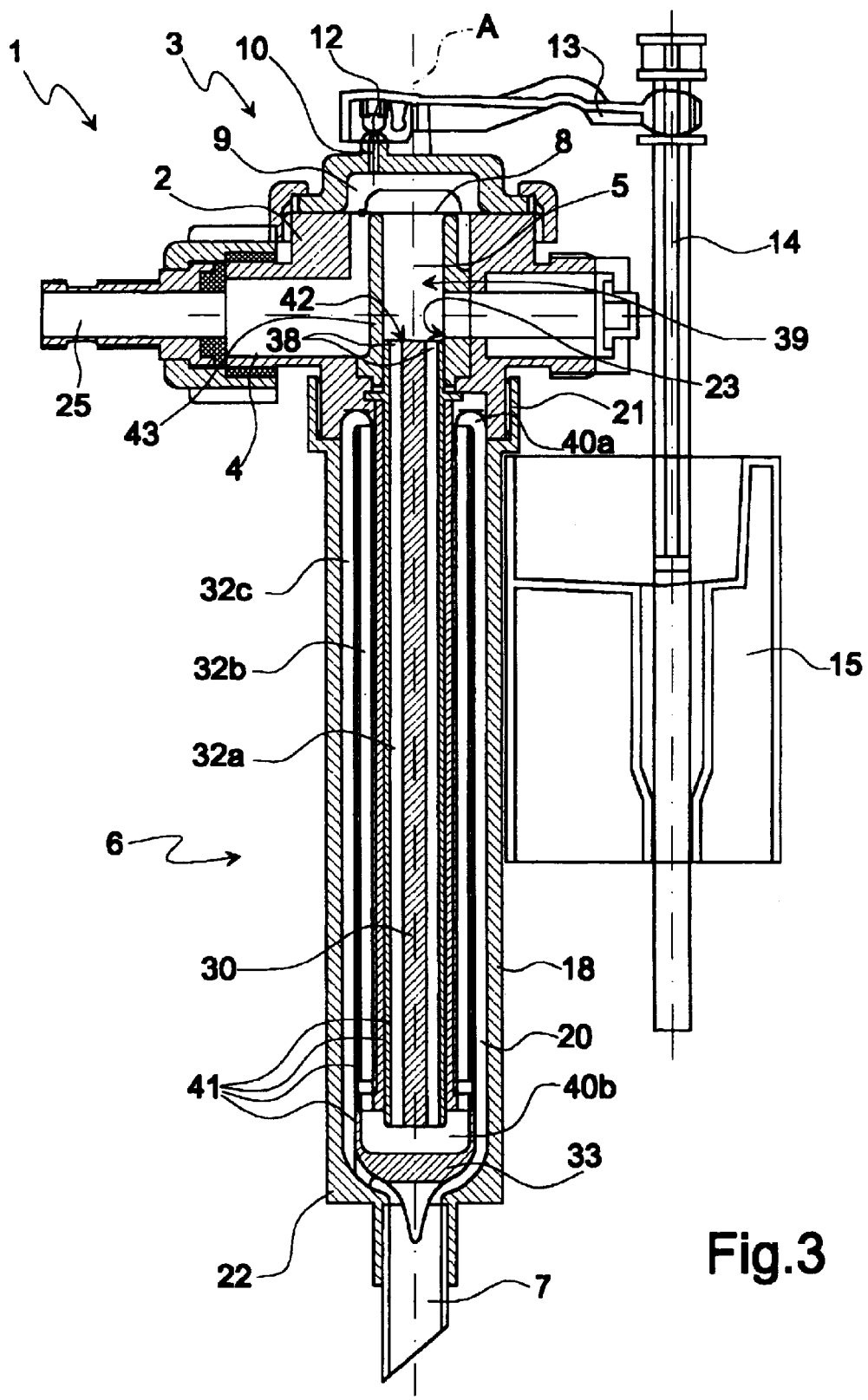
FIG. 3 shows a schematic longitudinal section of a second embodiment of the fill device according to the invention.

In the FIG. 3 variation, in which details similar to or identical with those already described are indicated using the same reference numbers, silencer 6 is located downstream from valve assembly 3, which is again housed in a body 2 and interposed between an inlet conduit 4 and an outlet conduit 5; and silencer 6 is located beneath body 2, and extends along an axis A which, in use, is substantially vertical.

Silencer 6 again comprises a tubular casing 18 extending along axis A between two opposite axial ends 21, 22; axial end 21 has an inlet opening 23 connected to outlet conduit 5; axial end 22 is connected to an outflow pipe 7 (which may even be dispensed with); casing 18 has a cylindrical inner chamber 20 housing a cartridge 30, which may be removable, and which has a bundle of substantially straight, parallel, circular-section tubes 32 housed inside cartridge 30 and parallel to axis A.

Cartridge 30 comprises a body 33 housed in sliding manner inside chamber 20, and in which tubes 32 are formed. In the example shown, body 33 is defined by various parts 41 fitted together, but may obviously be formed differently. More specifically, parts 41 are elongated along axis A, are arranged concentrically about axis A, are inserted axially one inside another, and rest axially one on another by means of shoulders.

A first group of downflow tubes 32a, a second group of upflow tubes 32b, and a third group of downflow tubes 32c are provided, are arranged, for example, in concentric circles about axis A, and are connected by junctions 40a, 40b located at axial ends 21, 22 of casing 18 respectively (and defined, for example, by respective inner compartments of chamber 20).

At axial end 21 of casing 18, body 33 has an end surface 42 facing outlet conduit 5 and having access openings 38 to tubes 32a; and an end portion 43 of outlet conduit 5 and end surface 42 with access openings 38 define a conveyor 39 for conveying water into tubes 32a.

In this case, too, the flow section (i.e. internal cross section) of tubes 32 is such that flow of the water inside is substantially laminar.

The FIG. 3 embodiment operates in the same way as described with reference to FIGS. 1 and 2: when valve assembly 3 is opened, water from the mains flows through fitting 25, along inlet conduit 4, and, on exceeding diaphragm 8, flows along outlet conduit 5, and is conveyed and divided by conveyor 39 into tubes 32a; the water flows down tubes 32a to junction 40b, then up along tubes 32b to junction 40a, back down along tubes 32c and out along outflow pipe 7.

When the flush tank is full, float 15 closes valve assembly 3 to cut off the water supply. In this case, too, noise is reduced considerably.

Clearly, further changes may be made to the device as described and illustrated herein without, however, departing from the scope of the present invention.

In particular, the incoming water can be fed into the end of the silencer located, in use, at the top or bottom.

Various groups of channels 31, along which water flows in opposite directions, may be provided. Theoretically, even only one group of channels, along which water flows in the same direction, may be sufficient to achieve a certain reduction in noise when filling the tank. For best results, however, and to reduce the size of device 1, at least two groups of channels, along which water flows in opposite directions, should be provided. Clearly, provision may also be made for three or more groups, along which water flows in opposite directions.

Even the arrangement of channels 31 inside silencer 6, and in particular about axis A, may be other than as described and illustrated.

What is claimed is:

1. A silent operating fill device (1) for a lavatory flush tank comprising: a silencer (6) extending along a central axis (A) through which a stream of water entering said tank flows; said silencer comprising a plurality of elongated channels (31) within said silencer (6), said multiplicity of channels (31) extending substantially parallel to said axis (A), and into which said entering stream of water is divided; said channels (31) further comprising a plurality of channels (32a) and a plurality of second channels (32b) parallel to one another and through which the stream of water flows in opposite directions, said first and second channels (32a, 32b) having an internal cross section such that the flow of water therein is substantially laminar.

2. A device as claimed in claim 1, wherein said channels (31) have a circular crossection such that the flow of water therein is substantially laminar.

3. A device as claimed in claim 2, wherein said multiplicity of channels (31) comprise a bundle of substantially straight, parallel tubes (32) housed inside said silencer (6) and parallel to said axis (A).

4. A device as claimed in claim 3, wherein said silencer (6) comprises a casing (18) having a substantially cylindrical inner chamber (20) housing said tubes (32).

5. A device as claimed in claim 4, wherein said chamber (20) houses a cartridge (30), which is removable, and wherein said tubes (32) are formed.

6. A device as claimed in claim 5, wherein said cartridge (30) comprises a solid cylindrical body (33) slidingly received within said chamber (20), a said tubes (32) formed within and extending axially through said body (33).

7. A device as claimed in claim 1, including a conveyor (39) for dividing and conveying said stream of water into said channels (31).

8. A device as claimed in claim 7, wherein said silencer (6) comprises a plurality of first channels (32a) and a plurality of second channels (32b), within which said stream of water flows in opposite directions.

9. A device as claimed in claim 8, wherein said silencer (6) comprises, at a first axial end (21) thereof, an inlet opening (23) communicating with said conveyor (39); a second axial end (22) of said silencer (6), opposite said first axial end (21), having a junction (40) connecting said first and said second channels (32a, 32b).

10. A device as claimed in claim 1, including a float (15) operated, on-off, water control valve assembly (3), located upstream from said silencer (6), thereby controlling the flow of water through said silencer (6).

11. In a silent-operating fill device for a lavatory flush tank (1) having: a silencer (6) extending along an axis (A) through which an entering stream of water flows; a multiplicity of channels (31) defined within said silencer (6), said channels extending along said axis (A), and into which said stream of water is divided; the improvement wherein said channels (31) comprise a bundle of substantially, parallel, circular cross section tubes (32) housed within said silencer (6) and parallel to said axis (A), said tubes (32) having an internal circular cross section with an inside diameter ranging between 0.5 and 3 mm, whereby the flow of the water within said tubes (32) is substantially laminar.

12. In a silent-operating fill device (1) for a lavatory flush tank having a silencer (6) extending along an axis (A) and through which entering water flows; said silencer (6) having a substantially radial inlet opening (23) for receiving therein said entering water, a multiplicity of channels (31) formed within said silencer (6), extending along said axis (A), and into which said entering water is divided; said channels (31) comprising a bundle of substantially straight, parallel, circular cross sectioned tubes (32) inside of said silencer (6) and parallel to said axis (A), said channels (31) being generally perpendicular to said radial inlet opening (23); the improvement wherein said bundle of tubes (32) includes a plurality of first tubes (32a) and a plurality of second tubes (32b) parallel to one another, and through which said entering water flows in opposite directions; said first and second tubes (32a, 32b) having an internal circular cross section which is such that the flow of water inside is substantially laminar.

13. A water filling device for a lavatory flush tank comprising:

a) an elongate casing (18) having a central axis (A), b) said elongate casing (18) having a water feeding conduit (24) and a water outlet (5), c) a solid cartridge (36) removably received within said elongate casing (18), said solid cartridge (36) having a first plurality of tubes (32a) and a second plurality of tubes (32b) extending axially therethrough and generally parallel to said central axis (A), said tubes (32a, 32b) having a water inlet end and a water exit end whereby the water exit ends of said first plurality of tubes (32a) are in fluid communication (27) with said water inlet ends of said second plurality of tubes (32b) such that the flow of water within said first plurality of tubes (32a) is in the opposite direction of the flow of water within said second plurality of tubes (32b), d) a water supply inlet (4) between said water feed conduit (24) and said inlet ends of said first plurality of tubes (32a), e) control valve means (3) between said water exit ends of said second plurality of tubes (32b) and said water outlet (5).

* * * * *

UNITED STATES PATENT AND TRADEMARK OFFICE
CERTIFICATE OF CORRECTION

PATENT NO.     : 6,810,904 B2
DATED          : November 2, 2004
INVENTOR(S)    : Figueiredo, Noe et al.

It is certified that error appears in the above-identified patent and that said Letters Patent is hereby corrected as shown below:

Column 4,
Line 3, after "...said chamber (20),..." please delete "a"

Signed and Sealed this

First Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,810,904 B2
DATED : November 2, 2004
INVENTOR(S) : Figueiredo, Noe et al.

It is certified that error appears in the above-identified patent and that said Letters Patent is hereby corrected as shown below:

<u>Column 4,</u>
Line 27, after "...said chamber (20),..." please delete "a"

Signed and Sealed this

Fifteenth Day of March, 2005

JON W. DUDAS
*Director of the United States Patent and Trademark Office*